United States Patent [19]
Hudson et al.
[11] Patent Number: 4,924,232
[45] Date of Patent: May 8, 1990

[54] METHOD AND SYSTEM FOR REDUCING PHASE ERROR IN A PHASED ARRAY RADAR BEAM STEERING CONTROLLER

[75] Inventors: Ralph E. Hudson, Los Angeles; Stanley O. Aks, Cerritos; Peter P. Bogdanovic, Los Angeles; David D. Lynch, Northridge, all of Calif.

[73] Assignee: Hughes Aircraft Company, Los Angeles, Calif.

[21] Appl. No.: 265,079

[22] Filed: Oct. 31, 1988

[51] Int. Cl.[5] .................................... G01S 7/40
[52] U.S. Cl. .................................... 342/174; 342/377
[58] Field of Search ............... 342/165, 173, 174, 377; 343/703

[56] References Cited

U.S. PATENT DOCUMENTS

| | | | |
|---|---|---|---|
| H173 | 12/1986 | Claborn et al. | 342/165 |
| 4,060,806 | 11/1977 | Davies et al. | 342/165 |
| 4,176,354 | 11/1979 | Hsiao et al. | 342/165 |
| 4,488,155 | 12/1984 | Wu | 342/377 |
| 4,532,518 | 7/1985 | Gaglione et al. | 342/377 |
| 4,652,883 | 3/1987 | Andricos | 342/165 |
| 4,700,192 | 10/1987 | Zezuto et al. | 342/165 |
| 4,724,440 | 2/1988 | Lopez et al. | 342/165 |
| 4,811,023 | 3/1989 | Gelernter et al. | 342/165 |

*Primary Examiner*—Thomas H. Tarcza
*Assistant Examiner*—Mark Hellner
*Attorney, Agent, or Firm*—Leonard A. Alkov; Wanda Denson-Low

[57] ABSTRACT

The method and system for reducing phase error of phased array radar beam steering controllers having digitally controlled phase shifters includes the monitoring of individual digitally controlled phase shifter elements, determining an additive phase correction to reduce the number of failed phase shifter elements, determining whether said additive phase correction is achievable by comparing the stuck bit state at each said failed changers element with said additive phase correction and adjusting the phase commands to the nearest values which can be achieved if the additive phase correction is unachievable.

12 Claims, 11 Drawing Sheets

METHOD AND SYSTEM FOR REDUCING PHASE ERROR IN A PHASED ARRAY RADAR BEAM STEERING CONTROLLER

BACKGROUND OF THE INVENTION

1. Field of the Invention

This invention relates generally to beam steering controllers for phased array radar systems, and more particularly relates to a method for reducing phase error of digitally controlled phase shifters in beam steering controllers for phased array radar.

2. Prior Art

Conventional radar systems have typically involved the use of a constantly rotating mechanically steered radar dish, which can gather information over broad areas about a large number of objects. However, the update rate, the rate at which a radar takes new readings of targets, is limited by the rate at which the radar dish turns on its shaft. A single mechanically steered radar can provide limited information concerning one or a few closely spaced objects, but in a number of circumstances, there is a necessity for tracking a large number of targets over broad areas. Until recently, only groups of radars, each assigned to one or several of the targets could serve that purpose. Innovations in phased array radar have improved the information gathering ability so that hundreds of targets scattered through a broad volume of space can be watched simultaneously, with the radar beam being electronically redirected from target to target in a matter of microseconds.

The electronic beam steering of phased array radar takes advantage of the principle that wave patterns resulting from adjacent radiating sources will interfere. Superposition of the wave patterns determines how they will interact. If the individual wave forms are in phase, so that crests coincide with crests, and troughs coincide with troughs, the patterns will result in constructive interference, but if the wave forms are out of phase, destructive interference will result, with the signals yielding a weaker signal or cancelling each other entirely.

If the signals from a phased array of radiating elements leave the array in phase, they add up in phase along the boresight of the array. Delaying of signals from each of the radiating elements by amounts that increase steadily across the face of the array causes a signal to lag a fraction of a wavelength behind the signal from an adjacent element, changing the relative phases of the signals. The direction of the radar signal will then not be straight down the boresight of the antenna, but off to the side in the direction of the increasing phase delay. The phase slope is the rate of change of the phase angle across the face of the antenna.

This type of phase lag steering is implemented by a phase shifter, which conventionally consists of variable susceptance elements which can be selectively introduced in the path of the signal as it travels on its way from an oscillator or amplifier to an individual radiating element. Thus, increasing the group delay of the wave guide or cable through which the signal which travels introduces a delay or phase shift in the transmission of the signal. The phase shifting can thus proceed in steps, using a hierarchy of susceptances attached to each element. The switching of the individually selected susceptance elements can be digitally controlled, by a central computer.

A typical phase shifting radar uses three bit phase shifters, phase shifters with $2^3$ equivalent path lengths. Although the switching is initially determined digitally, and even though the implementation of susceptance selection can be performed mechanically or electronically, e.g. by electromechanical or diode switches, the ultimate control of phase shifting is essentially analog, requiring a large quantity of microwave circuit elements for an entire array. Such a radar system is described in Brookner, "Phased Array Radars" Scientific American, Vol. 252, No. 2, Feb. 1985, pp. 94–102. As thousands of individual elements can be included in such an array, with each individual element being controlled by switches, each having microwave circuit elements to be switched in to determine varying signal delays, it would be desirable to provide acceptable antenna array performance in the presence of failures in the phase shifters. Even if each phase shifter element is very reliable, the need for long periods of maintenance free operation, typically years, and the large number of elements makes the probability of a few failures very high. Thus to extend the time between maintenance actions, the phased array could be implemented to sense failures in the phase shifters and correct a small number of failures, typically one percent of the total phase or elements.

One recent method of digitally controlling the phase of individual radiating elements in a phased array is by way of introduction of a cascaded sequence of amounts of binarily weighted group delays at each radiating element. As each quantity of binary weighted group delay or phase shift or either switched in or out of position according to commands by a central radar data processor, the phase control of each individual element in the array is subject to direct digital control from the central processor. A common failure mechanism which arises in the implementation of such a design is that the phase shifting element may become stuck in the wrong phase position, causing an error in the phase angle of the individual radiating element. It would therefore be desirable to monitor the failure status of each phase changer of each phase shifter, and reduce or eliminate any phase error due to such phase changer failures. The method and system of the invention fills this need by providing alternative phase shift commands to reduce phase error resulting from such phase shifter failures.

SUMMARY OF THE INVENTION

The present invention provides a method and a system for reducing phase error of digitally controlled phase shifters in a beam steering controller system for phased array radar antenna, in which failure-free phase slope commands are directed to individual phase shifter elements, by monitoring failures of phase changers in each phase shifter and correcting the list of phase commands to the phase shifters so as to minimize phase error.

Briefly and in general terms, a method for reducing phase error of digitally controlled phase shifters for such a beam steering controller system, in which failure free phase slope commands are directed to individual phase shifter elements, comprises detecting failure of each individual digitally controlled phase shifter element; determining an additive phase correction which will reduce the apparent number of failed phase shifter elements; determining whether said additive phase correction is achievable by comparing the stuck bit state at each said failed changer element with said additive phase correction; and adjusting the phase commands to the nearest values which can be achieved when the additive phase correction is unachievable. The system of the invention similarly generally is to be used in combination with a beam steering controller system having digitally controlled phase changer elements at individual phase shifters for corresponding radiating elements, and comprises means for detecting failure of each individual digitally controlled phase shifter element; means for determining an additive phase correction which will reduce the number of failed phase shifter elements; means for determining whether said additive phase correction is achievable by comparing the stuck bit state at each said failed changer element with said additive phase correction; and means for adjusting the phase commands to the nearest values which can be achieved when the additive phase correction is unachievable.

In a preferred implementation of the method of the invention, when the nearest value adjustment has been made on one side of the antenna center, and the opposite side of the antenna has no error, an equal error is introduced on the opposite side of the antenna to minimize difference pattern bias. The average phase slope of the antenna is also preferably adjusted to be equal to the commanded phase slope. An alternative way of approximating the commanded phase slope is to adjust the list of phase commands so that the mean square deviations about the slope are minimized. When there are a multiplicity of phase changer errors, it is further preferred to implement the phase corrections by applying the most significant bit failure correction last.

Other aspects and advantages of the invention will become apparent from the following detailed description, and the accompanying figures, illustrating by way of example the features of the invention.

DETAILED DESCRIPTION OF THE INVENTION

Figure 1:
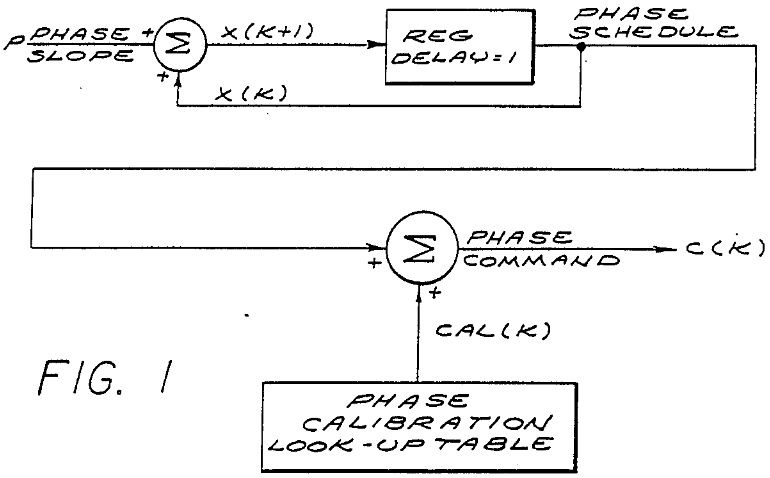
FIG. 1 is schematic diagram of a failure free phase command circuit of a radar data processor.

As is shown in the drawings for purposes of illustration, the invention concerns a method and system for reducing phase error of digitally controlled phase shifters in a beam steering controller system for phased array radar, in which phase commands for achieving a failure free phase slope are directed to individual phase changer elements of phase shifters, by monitoring the failure of each individual digitally controlled phase changer element of each phase shifter; determining an additive phase correction to be applied to each phase shifter to reduce the number of failed phase shifters; and adjusting the list of the phase commands to the nearest values which can be achieved if the additive phase correction is unachievable. Digitally controlled phase shifters in phased array radar beam steering controllers are subject to phase errors due to failures of individual phase changer elements in the phase shifters, requiring such a method of detecting and implementing phase command corrections to reduce phase errors.

The invention therefore accordingly provides for a method for reducing phase error of digitally controlled phase shifters in a beam steering controller system for phased array radar, in which phase commands for achieving a failure free phase slope are directed to individual phase shifter elements, comprising detecting failure of each individual digitally controlled phase shifter element; determining an additive phase correction which will reduce the apparent number of failed phase shifter elements; and adjusting said phase commands to the nearest values which can be achieved when said additive phase correction is unachievable. The invention further provides for a system for reducing phase error of digitally controlled phase shifters in a beam steering controller system for phased array radar, in which phase commands for achieving a failure free phase slope are directed to individual phase shifter elements, comprising means for detecting failure of each individual digitally controlled phase shifter element; means for determining an additive phase correction which will reduce the number of failed phase shifter elements; and means for adjusting said phase commands to the nearest values which can be achieved when said additive phase correction is unachievable.

The invention is implemented as a method and system for reducing phase errors in an improved digitally controlled beam steering controller (BSC). The inputs to the BSC are considered to be: (a) the required element-to-element phase difference; and (b) the failure status of each phase changer of each phase shifter. The output is the list of commands for each phase shifter expressed in binary angle measure (BAM) format as shown in Table 1.

TABLE 1

Typical Phase Shifter Schedule for Array Consisting of Eight 5-Bit Shifters for a Corporate Feed Array

| | a(ik) | Phase Shifter Number (k) 1 | 2 | 3 | 4 | 5 | 6 | 7 | 8 |
|---|---|---|---|---|---|---|---|---|---|
| Bit No. | 4 | 0 | 0 | 0 | 0 | 0 | 0 | 0 | 0 |
| (i) | 3 | 0 | 0 | 0 | 1 | 1 | 1 | 0 | 0 |
| | 2 | 0 | 0 | 1 | 0 | 1 | 1 | 0 | 1 |
| | 1 | 0 | 1 | 1 | 0 | 0 | 1 | 1 | 0 |
| | 0 | 0 | 1 | 0 | 1 | 0 | 1 | 0 | 1 |
| BAM(k) | | 0 | 3 | 6 | 9 | 12 | 15 | 2 | 5 |
| Phase | | 0 | .59 | 1.18 | 1.77 | 2.36 | 2.95 | .39 | .98 |

$$\text{Phase} = \frac{2\pi}{2^B} \cdot \text{BAM} = \frac{\text{BAM} \cdot \pi}{16}$$

In the preferred embodiment of the invention, these outputs are selected to satisfy the following objectives:

(1) the average phase slope and the commanded phase slope should be equal; (2) the mean square deviations about the command phase slope should be minimized; and (3) the phase errors on symmetrically disposed halves of the electronically steered antenna should be equal and of the same sign. This last condition may be omitted when difference channel data is not being processed.

The beam steering controller preferably also has another output which indicates the nominal antenna phase. This quantity will be used by the signal processor to assure that data collected before and after antenna steering are coherently added in the proper phase relationship.

The improved beam steering controller implementing the system of the invention is comprised of three segments. The first segment determines the failure free command vector or set commands. In response to a determination of failed phase changers designated by binary weight classes as in Table 1, the second segment adjusts the failure free command by an additive constant which corrects for the majority of failures of each binary weight class separately. The third segment finds the achievable phase command which is nearest to desired command. The resulting error correction is preferably imposed on the symmetrically disposed radiating element at the same time.

The determination of the failure phase list can be realized as an accumulation, as is illustrated in FIG. 1, for which the following definitions apply.

$$C(k) := \frac{2\pi}{2^B} \sum_{i=0}^{B-1} a_{ik} 2^i$$

where $a_{ik}=0$ or 1,

B=number of bits $\cap$ is the logical "and" function

= is defined as arithmetic or logical equality

:= is defined as the assignment operator $a_{ik}$ S@0 is defined as $\underline{a}_i \cap F_i \cap \bar{S}_i$ $\underline{a}_{ik}$ S@1 is defined as $\bar{a}_i \cap F_i \cap S_i$ $\bar{a}_{ik}$ is defined as the complement of $a_i$ + is arithmetic addition modulo $2^B$ − is arithmetic subtraction modulo $2^B$ $$\text{place notation } (a_{B-1}a_{B-2} \ldots a_i \ldots a_1 a_0)_k = \sum_{i=0}^{B-1} a_{ik} 2^i$$

$\oplus$ is defined as the Exclusive Or Function

The circuit shown in FIG. 1 realizes the recursive relationship $$X(1) := -NP/2$$

$$X(k+1) := X(k) + P$$

$$C(k) := X(k) + CAL(k)$$

where X(k) is the failure free phase command at the $k^{th}$ radiating element, N is the total number of elements in the array, and P is the phase slope. The total failure free command C(k) generated by the phase values of each element from Table 1, where CAL is zero, would be approximately 10.22. The additive CAL phase calibration accounts for measured manufacturing variations and the built-in phase induced by the array feed structure. This represents a complete solution when any particular phase command is specified. In a failure free design the initial condition X(1) is preferably set so that radiating elements symmetrically disposed with respect to the array center have equal magnitude and opposite sign phase commands.

In an exemplary system of detecting failure of each phase changer in the array of phase shifters, sensors could be placed adjacent to or integral with each phase shifter to detect the functional status of the phase changer elements. Thus, the sensors would return a signal indicating whether the phase changer is switched into or out of position, to be received and interpreted by the radar data processor of the beam steering controller as a binary number and compared with the commanded status of the phase changers. As each commanded phase changer state is surveyed against the detected state, the list of errors would be input to the memory of the data processor for determination of alternate phase commands which will result in the least amount of phase error.

The first step of failure correction which occurs in the beam steering controller data processor upon detection of failed phase changers, comprises determining an additive phase which would reduce the apparent number of failed phase changers which end up in the wrong position. At each bit level a discriminant can be defined which is negative if an improvement can be achieved by reversing all the bits at that level.

The discriminant is defined as:

$$D(i) := 2^i \sum_{k=1}^{N} W(k,i) \cap [F(k,i) \cap \overline{(a(k,i) \oplus S(k,i))}]$$

for i=0 to B−1 where B is the number of bits; where W(k,i) is an error weighting usually related to the aperture weighting;

F(k,i) is a failure indicator;

F=0 indicates no failure;

F=1 indicates a failure;

a(k,i) is the commanded value of the bit;

S(k,i) indicates how the phase changer has failed;

S=0 indicates the phase changer is stuck low

S=1 indicates the phase changer is stuck high $[F_i \cap \overline{(a_i+S_i)}]_k=0$ indicates $a_{ik}=S_{ik}$ or no error; and $[F_i \cap \overline{(a_i+S_i)}]_k=1$ indicates $a_{ik} \neq S_{ik}$ (error).

This discriminant may be evaluated with or without weighting (i.e. W(k,i)=1). The weighting permits the beam steering controller to minimize the antenna degradation. Using a uniform weighting will result in minimizing the number of erroneously positioned bits at the given level. In either case, the discriminant is preferably calculated starting with zero bias first. The bias is incremented successively in sequence.

The set of phase commands that result from a single additive correction may still be unrealizable due to multiple phase changer failures. The next step is to minimize the phase error resulting from a failed phase changer by adjusting the commanded phase to the nearest value which can be achieved. There are two approaches to determine the nearest achievable command. In the case where the phase shifter has only a single failed phase changer, the best achievable phase command is determined by the following simple logic. If the failed phase changer is in the right state, do nothing. If the phase changer is in the wrong state, then depending on the failed bit location, implement the corrections as shown in FIGS. 2–8. In general, the rule that can be deduced from the error mappings is that all bits whose weights are below the failed bit are set equal to the complement of the $a_{i-1}$ bit; the bits above the failed bit are incremented when $a_i$ is stuck at 0 and $a_{i-1}$ is 1 and are decremented when $a_i$ is stuck at 1 and $a_{i-1}$ is 0 (since k is a constant for a given phasor it is not carried in the subscript on "a" for this discussion and the discussion which follows). The command to the failed bit is a "don't care" because it is stuck. There are two cases which are simple subsets of the above rule: when $a_i - a_o$ do nothing, and when $a_i = a_{B-1}$ no incrementing or decrementing is necessary (or even possible modulo $2^B$).

Figure 2:
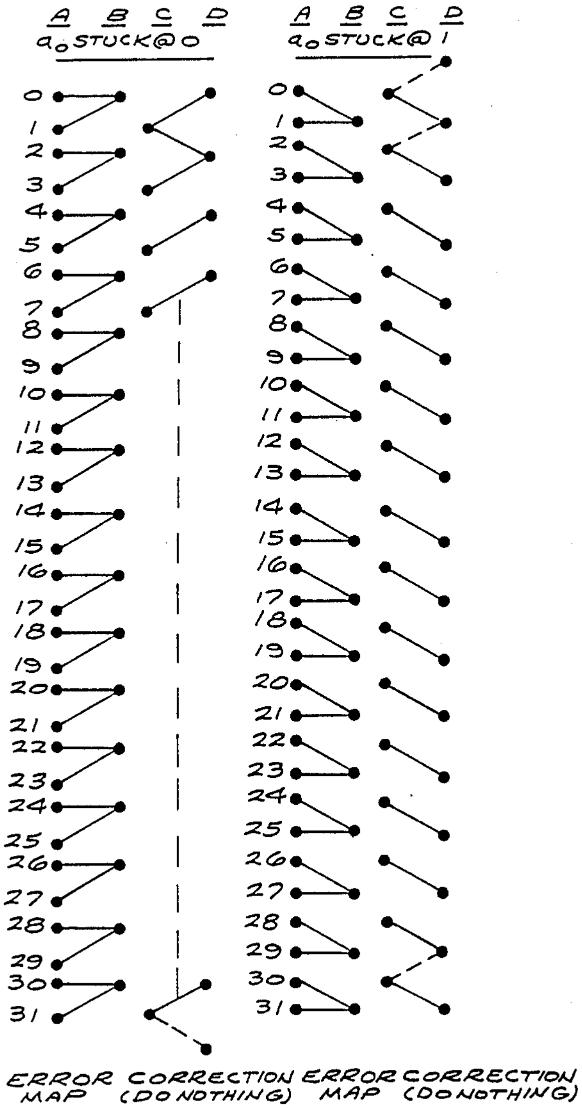
FIG. 2 is an error map and correction map for the least significant binary weight class of phase changers, $a_0$.

The nearest neighbor correction and error mappings of FIGS. 2–8 illustrate the commanded error free states for each binary angle measure as the points in Column A, and the realized values (which are sometimes in error) as the points in Column B. Column C again represents the commanded error free states, and Column D represents the nearest preferred binary angle measure state which is achievable, given the exemplary error conditions. FIG. 2 illustrates error states for $a_0$, the least significant binary weight class of phase changer, which may have a binary value of 1 or 0. For $a_0$ stuck at 0, if the commanded value is 1, the realized state will be 0. Similarly if the commanded state is 3, the realized state will be 2, and so on, so that only even values are achievable. Conversely, when the commanded $a_0$ state is stuck at 1, only odd value states will be achievable. Since the best correction would be to increment or decrement the commanded state by 1, and since this value is stuck, for both conditions where $a_0$ is stuck at 0 or 1, the strategy is to attempt no correction.

Figure 3:
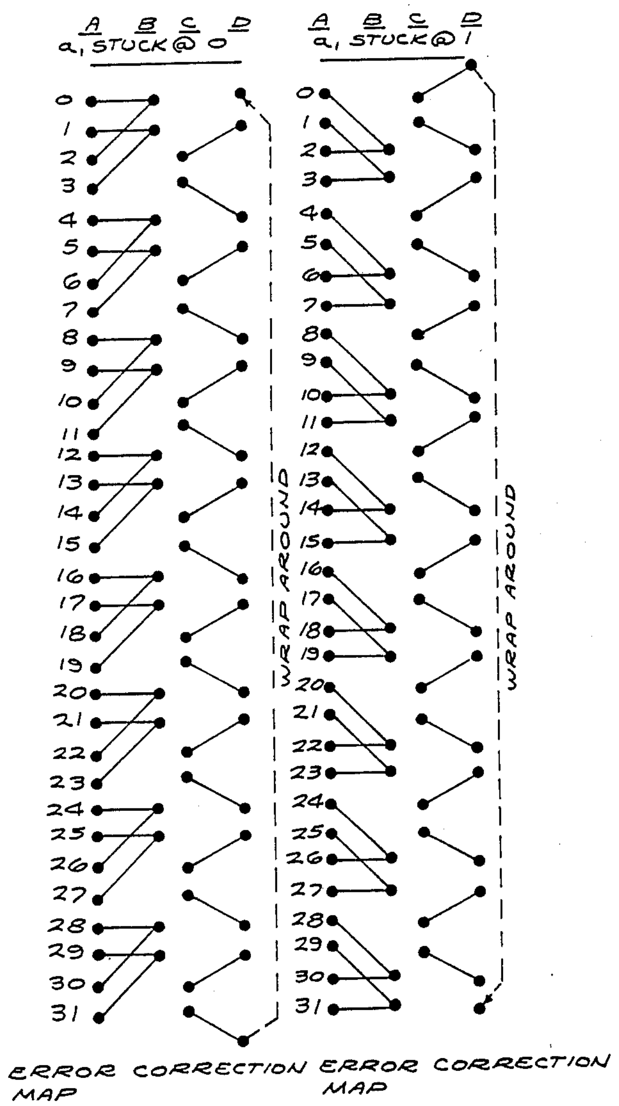
FIG. 3 is an error map and correction map of the binary weight class $a_1$ phase changers.

FIG. 3 illustrates the error states and suggested nearest neighbor phase corrections when $a_1$ weight class phase changers are stuck, representing the next most significant binary weight class; so that when $a_1$ is commanded to be at 1, and $a_1$ is stuck at 0, the realized state of binary angle measure will be decremented by a value of 2, and when $a_1$ is commanded be at 0, and $a_1$ is stuck at 1, the realized state of binary angle measure will be incremented by a value of 2 over the commanded state. In the situations where the commanded binary angle measure values are or 1, and $a_1$ is stuck at 0, the realized value will be correct. Where the commanded value is 2 or 3, the realized value will be and 1, respectively. Where the commanded binary angle measure value is 2, $a_0$ is 0 and $a_1$ is stuck at 0, so that the nearest value achievable would be 1, by incrementing $a_0$ to 1. Where the commanded value is 3, $a_0$ is 1, and $a_1$ is stuck at 0, so that the nearest achievable binary angle measure would be 4, requiring $a_0$ to be set to 0, and the value of 4 added by setting $a_2$ to 1. Conversely, where $a_1$ is stuck at 1, the commanded values of 0 or 1 would be high by 2 in the realized state. The closest achievable value of binary angle measure to 0 would be 31, and the closest achievable value of binary angle to 1 would be 2. The nearest neighbor corrections in FIGS. 4–8 are evaluated in a similar manner, according to the correction algorithms shown.

Figure 4:
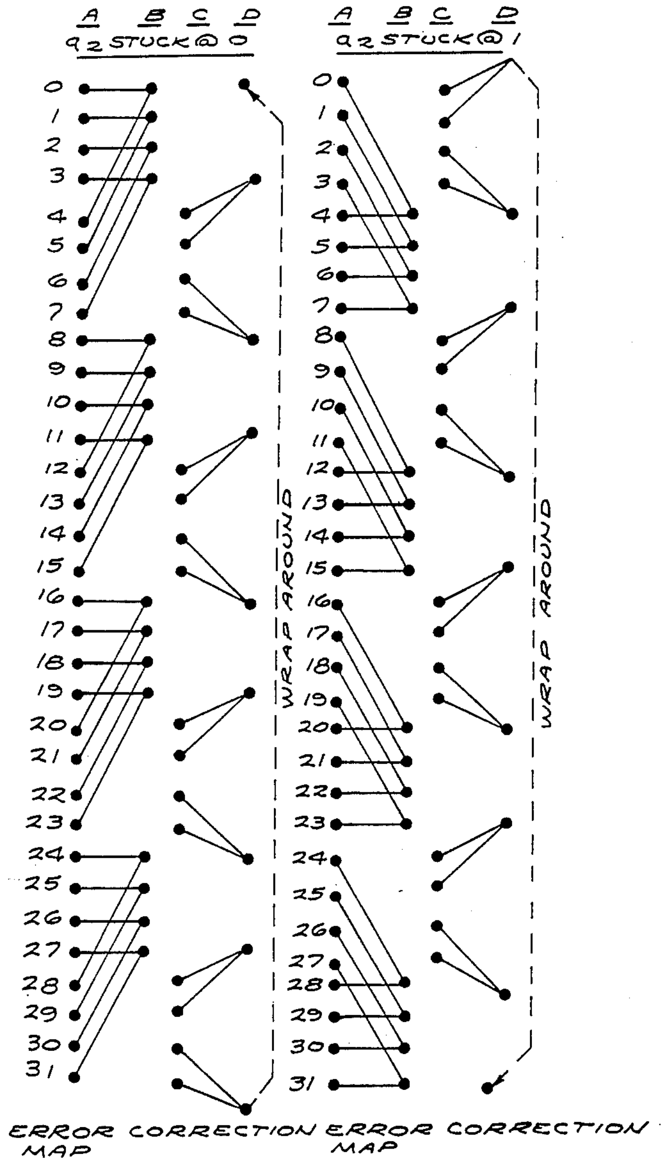
FIG. 4 is an error map and correction map of the binary weight class $a_2$ phase changers.
Figure 5:
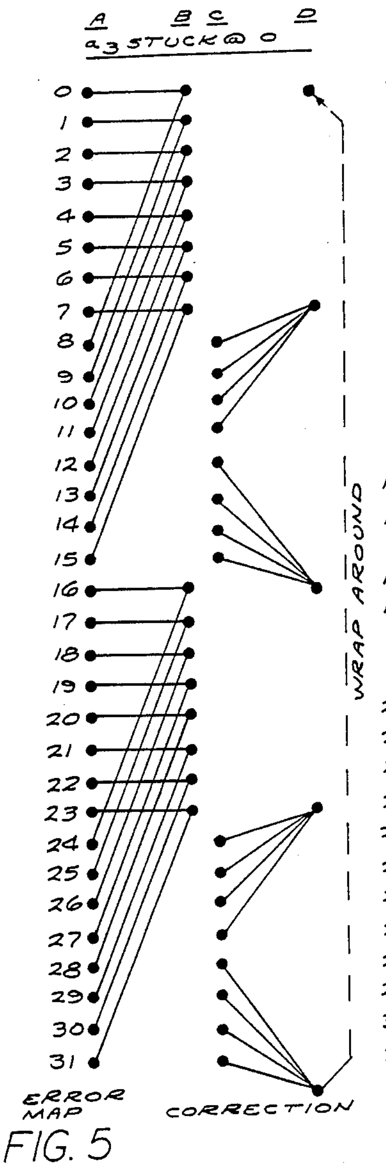
FIG. 5 is an error map and correction map of the $a_3$ binary weight class phase changers stuck at zero.
Figure 6:
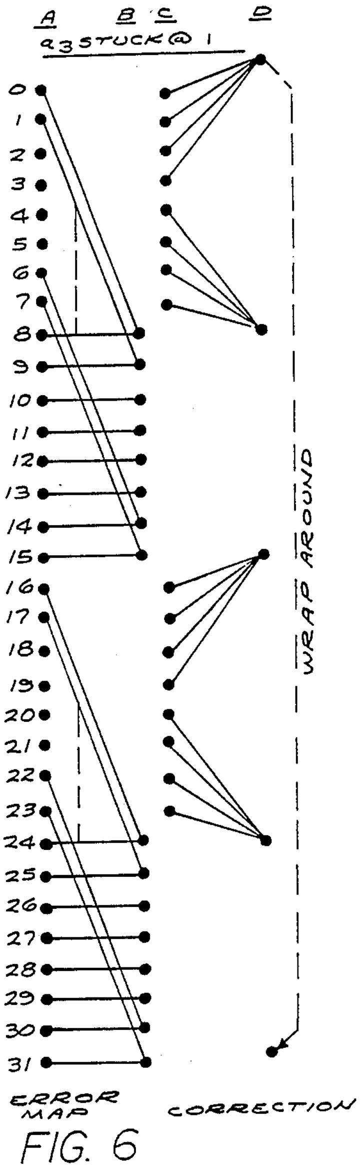
FIG. 6 is an error map and correction map of the $a_3$ binary weight class phase changers stuck at one.
Figure 7:
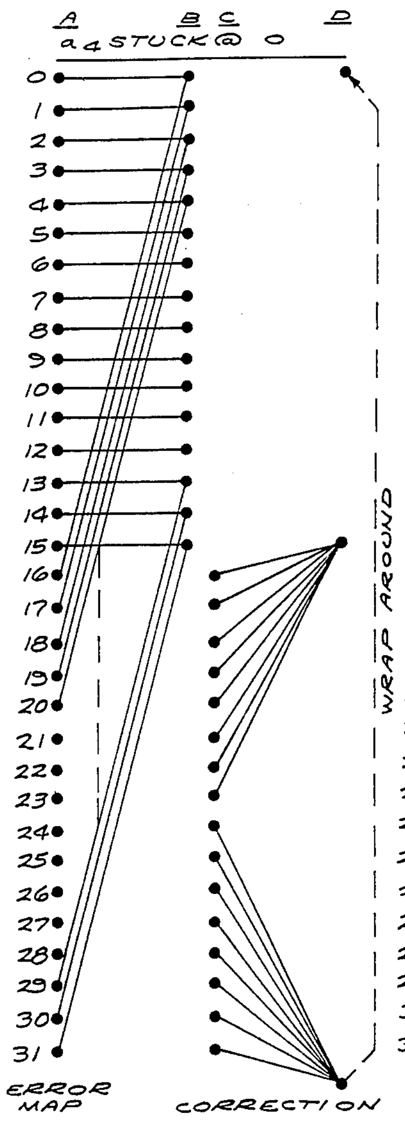
FIG. 7 is an error map and correction map of the $a_4$ binary weight class phase changers stuck at zero.
Figure 8:
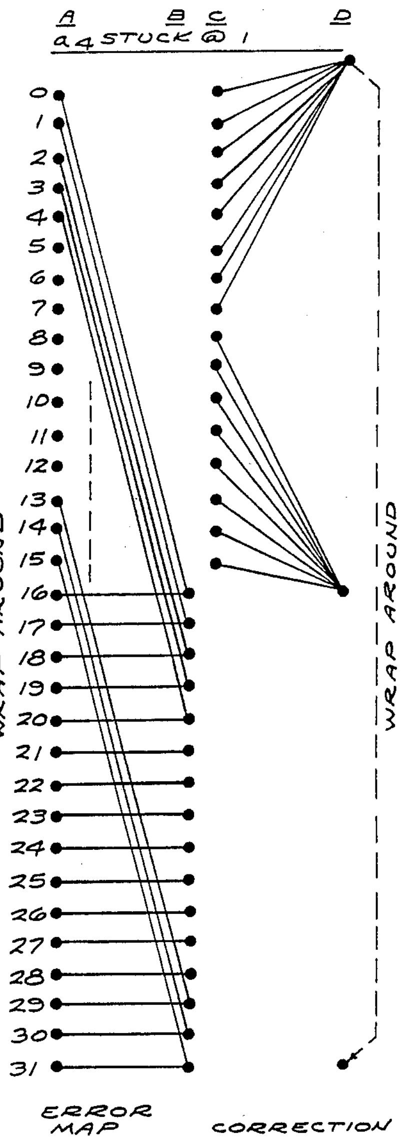
FIG. 8 is an error map and correction map of the $a_4$ binary weight class phase changer stuck at one.

Specifically with reference to FIG. 3, preferred correction algorithms would apply when the actual binary angle measure differs from that commanded:

If $a_1$ S@0 and
If $a_0=0$ then
  $a_0:=1$
If $a_0:=1$ then
  $a_0=0$, $a_4a_3a_2:=a_4a_3a_2+00100$ (i.e. $2^2$)
If $a_1$ S@1 and
If $a_0=0$ then
  $a_0:=1$, $a_4a_3a_2:=a_4a_3a_2-00100$ (i.e. $2^2$)
If $a_0=1$ then $a_0:=0$ Referring to FIG. 4, where $a_2$ is either stuck at 0 or 1, when there is an error condition the correction algorithms would be:

If $a_2$S@0 and
If $a_1=0$ then
  $a_1,a_0:=1$
If $a_1=1$ then
  $a_1$, $a_0:=0$
  $a_4a_3:=a_4a_3+01000$ (i.e. $2^3$)
If $a_2$S@1 and
If $a_1=0$ then
  $a_1,a_0:=1$
  $a_4a_3:=a_4a_3-01000$ (i.e. $2^3$)
If $a_1=1$ then
  $a_1,a_0=0$ Referring to FIGS. 5 and 6, where there is an error in the binary angle measure, If $a_3$S@0 and
If $a_2=0$ then
  $a_2,a_1,a_0=1$
If $a_2=1$ then
  $a_2,a_1,a_0:=0$
  $a_4:=a_4+10000$ (i.e. $2^4$)
If $a_3$S@1 then
If $a_2=0$ then
  $a_2,a_1,a_0:=1$
  $a_4:=a_4-10000$ (i.e. $2^4$)
If $a_2=1$ then
  $a_2,a_1,a_0:=0$ For the error conditions illustrated in FIGS. 7 and 8, If $a_4$S@0 and
If $a_3=0$ then
  $a_3,a_2,a_1,a_0:=1$
If $a_3=1$ then
  $a_3,a_2,a_1,a_0=0$
If $a_4$S@1 and
If $a_3=0$ then
  $a_3,a_2,a_1,a_0:=0$
If $a_3=1$ then
  $a_3,a_2,a_1,a_0:=0$ When there are multiple stuck bits, this simple approach may result in lower order bit commands which may not be achievable, but it will still result in the best correction that can be made for the most significant failure if the corrections are always applied implementing the most significant bit failure correction last. This example was given for 5 bits but can easily be extended to any number of bits by one skilled in the art.

In summary then, there are two types of corrections. The first correction is to add or subtract a constant phase "bias"so that the maximum number of stuck bits are in the "right" state, i.e. the stuck state equals the commanded state. The second correction is to apply "nearest neighbor" correction to the remaining stuck bits.

In the case where difference channel operation is required, the phase error should be equal on opposite sides of the antenna center. This means that where a nearest neighbor adjustment has been made on one side of the antenna and the opposite side has no error, it will be necessary to introduce an equal error on the opposite side. This will assure that the difference channel has a null at the peak of the mainlobe.

Figure 9:
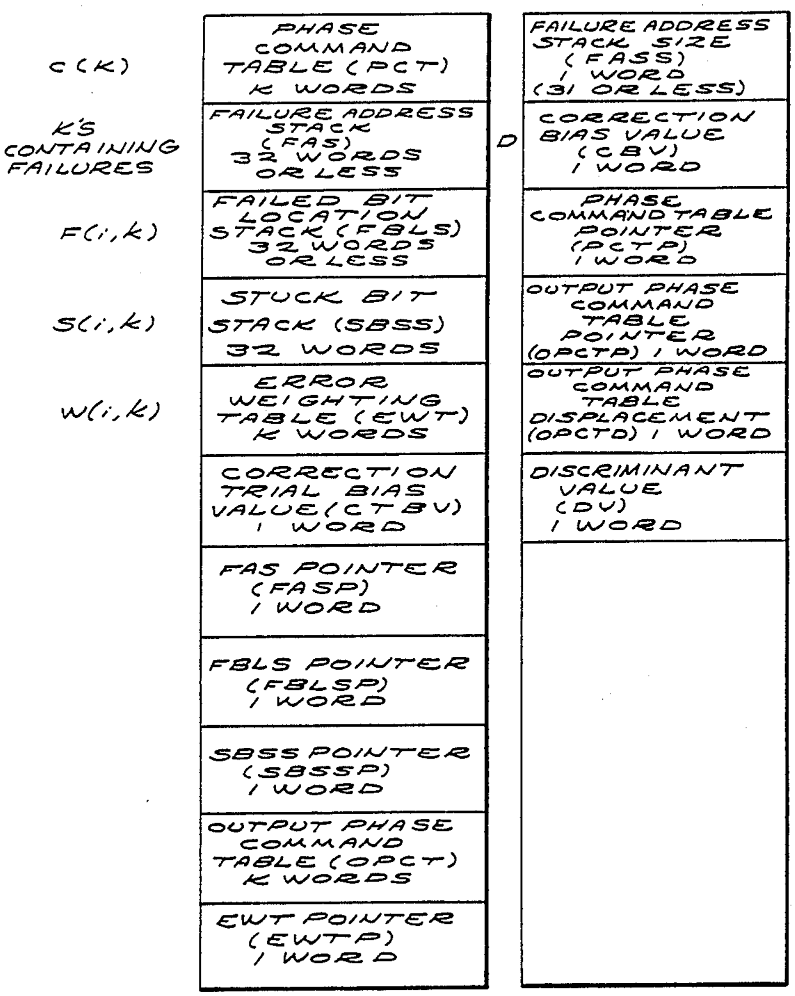
FIG. 9 is a memory map of a radar data processor for determining phase corrections.
Figure 10:
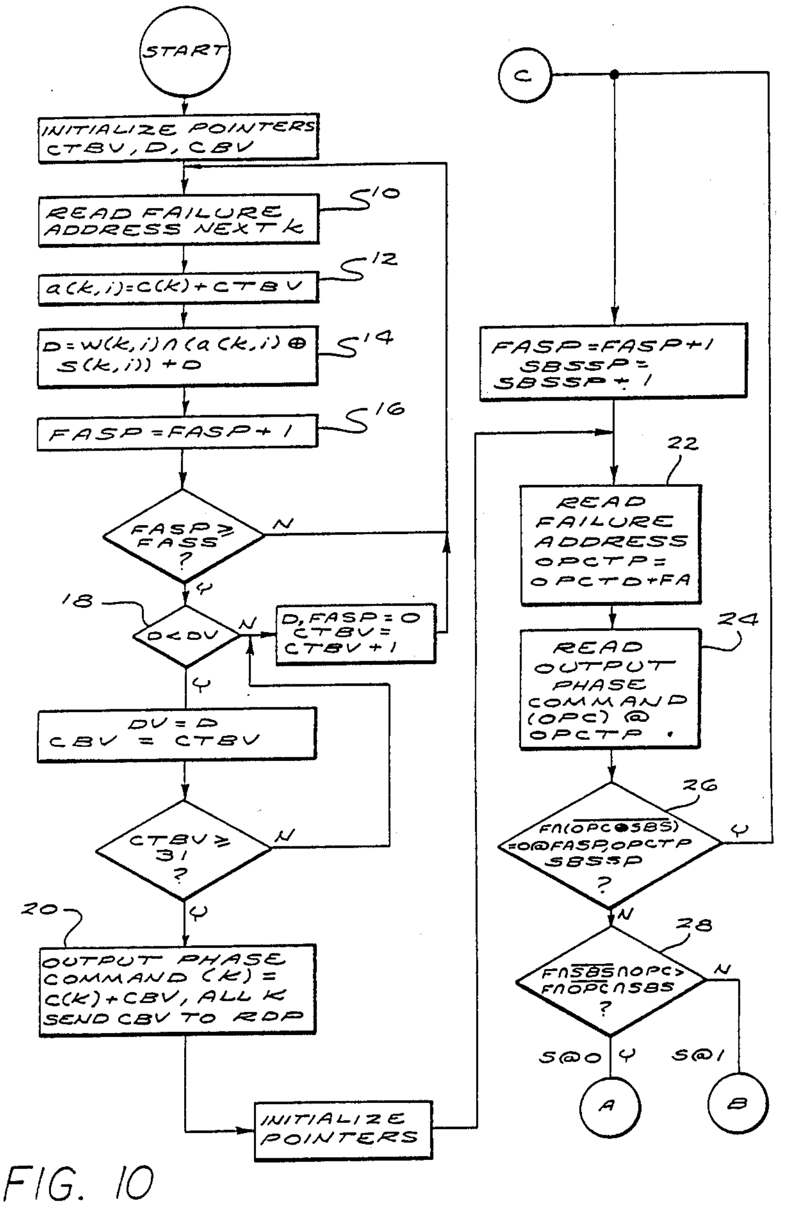
FIG. 10 is the first portion of a phase change correction flow chart.
Figure 10A:
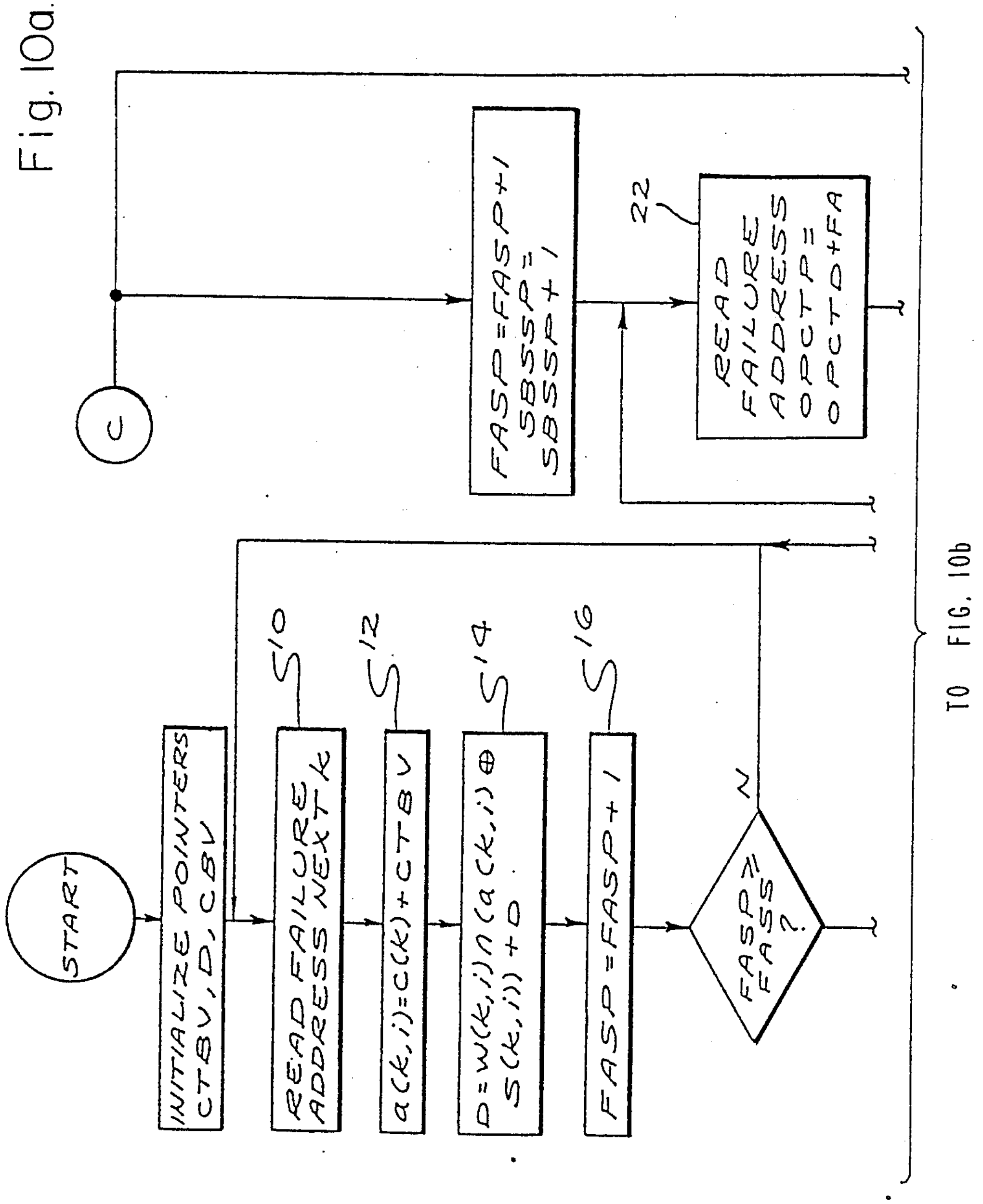
Figure 10B:
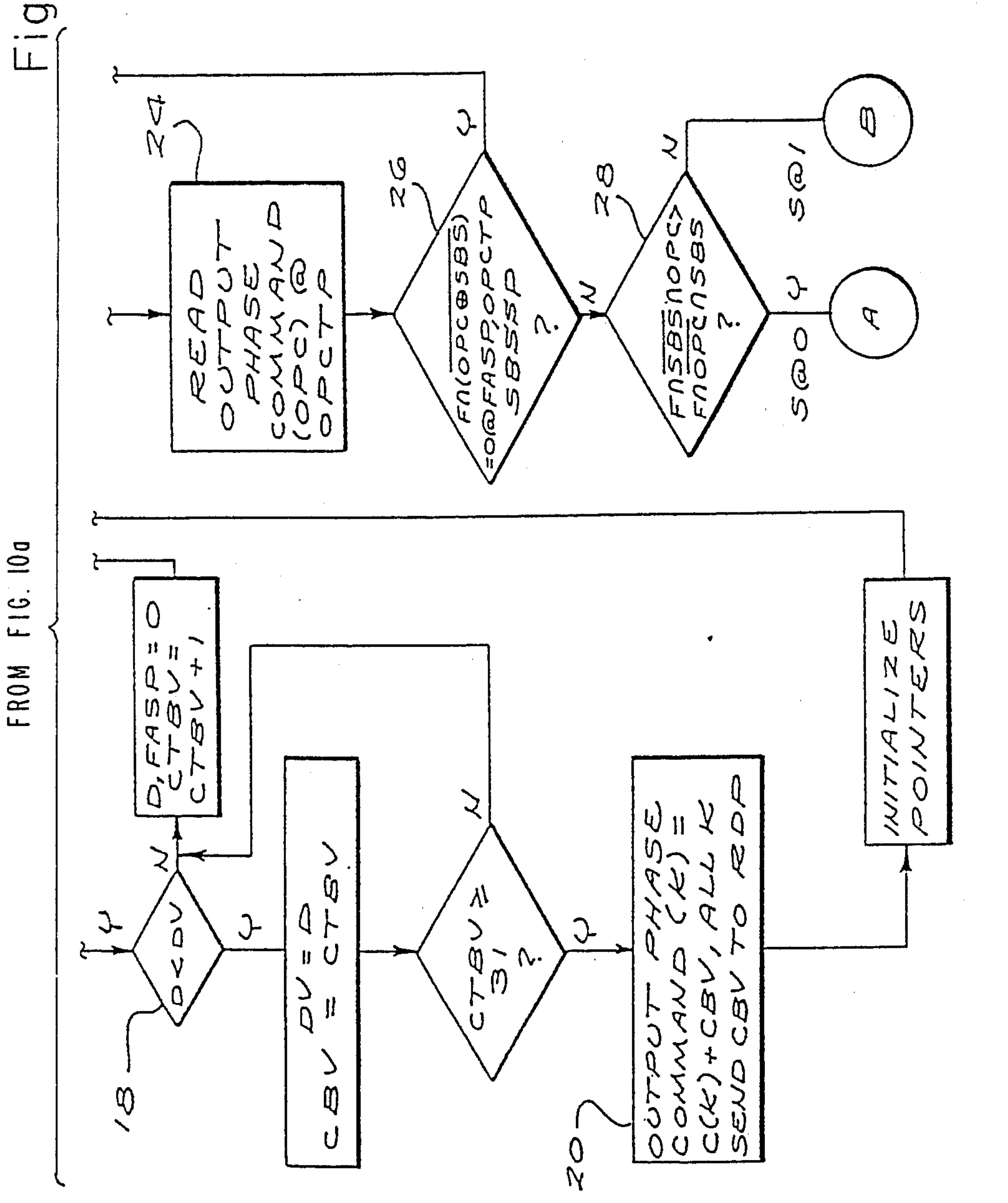
Figure 11:
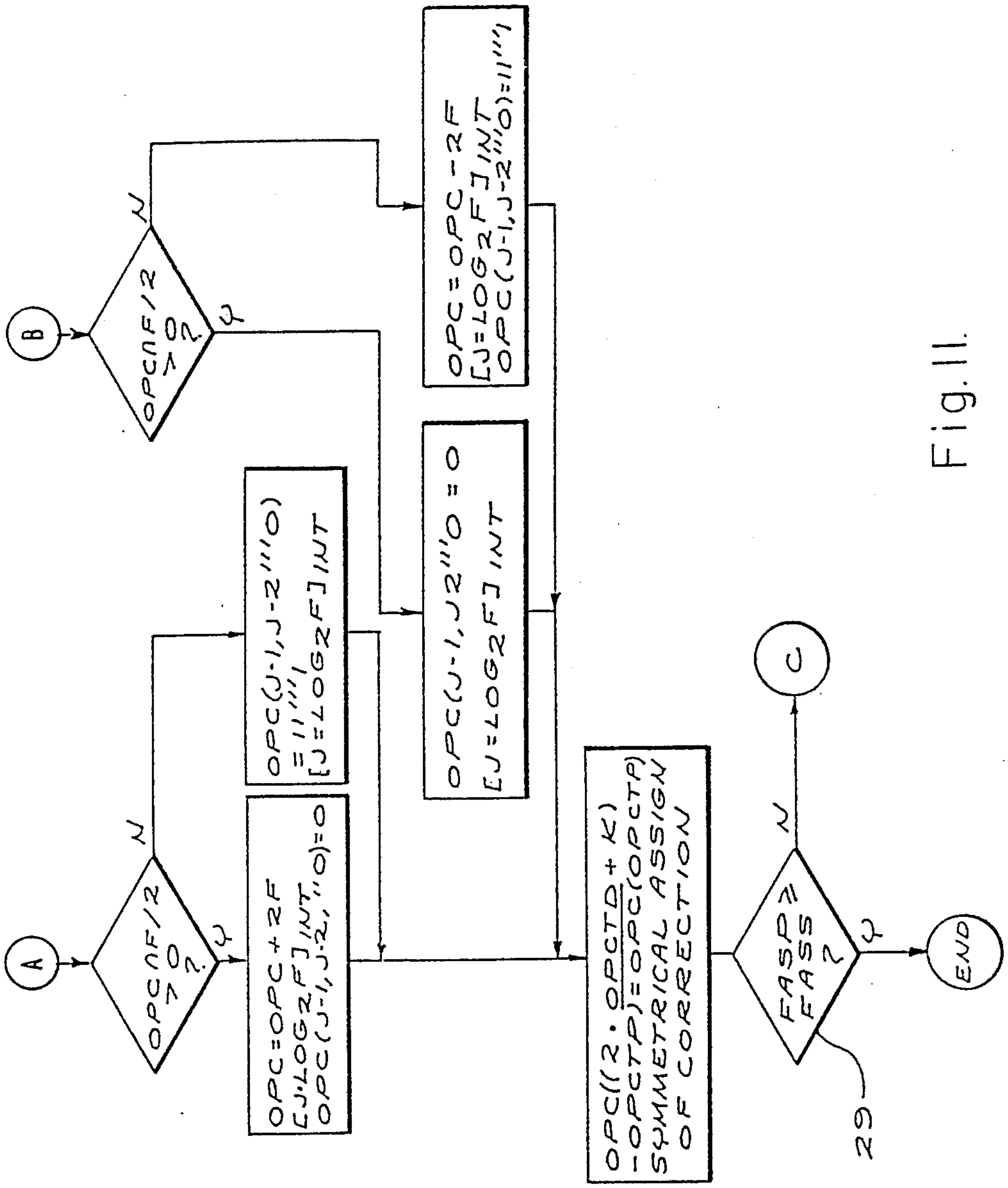
FIG. 11 is the second portion of a phase correction flow chart.

In order to understand the operation better, a block diagram implementation is shown in FIGS. 9–11. It should be understood that this is an exemplary way to implement the correction, and that alternative implementations are possible. FIG. 9 shows a memory map. FIG. 10 shows a flow diagram assuming an 8086 type microprocessor based beam steering controller data processor or arithmetic unit. The flow diagram first applies the bias correction and then applies the column by column nearest neighbor correction.

With reference to FIGS. 9–11, in the example, failure addresses of the phase changers located to have failed are read at 10 and stored in memory in the failure address stack (FAS). As the first step in achieving a correction of phase error, a correction trial bias value (CTBV) is added to the failure free phase commands for each phase changer at 12, and a discriminant D for each bit level is determined at 14, as defined previously. The result of the discriminant is tested at 18, and after a correction bias value has been derived, the output phase commands adjusted with the additive correction are further tested to determine if the correction are achievable. Failure addresses are read from memory at 22, along with the output phase commands. Evaluation of the determinant F (OPC SBS) determines whether the additive correction is achievable. If the stuck bit state is the same as the corrected command state, the value of the determinant will be zero, indicating there will be no error. Otherwise, the correction will be unachievable. If the additive correction is determined to be achievable for the particular failed address at 26 so as to require no further corrections, the next address is checked. If a further correction is necessary, because the additive correction is unachievable, the nearest neighbor correction is determined according to whether the stuck bit state is either 0 or 1, (A or B) at 28. Once the nearest neighbor correction is determined, the failure address stock point is checked at 29 to determine if there are any more failure addresses, and if there are, these are further processed at C.

Figure 12:
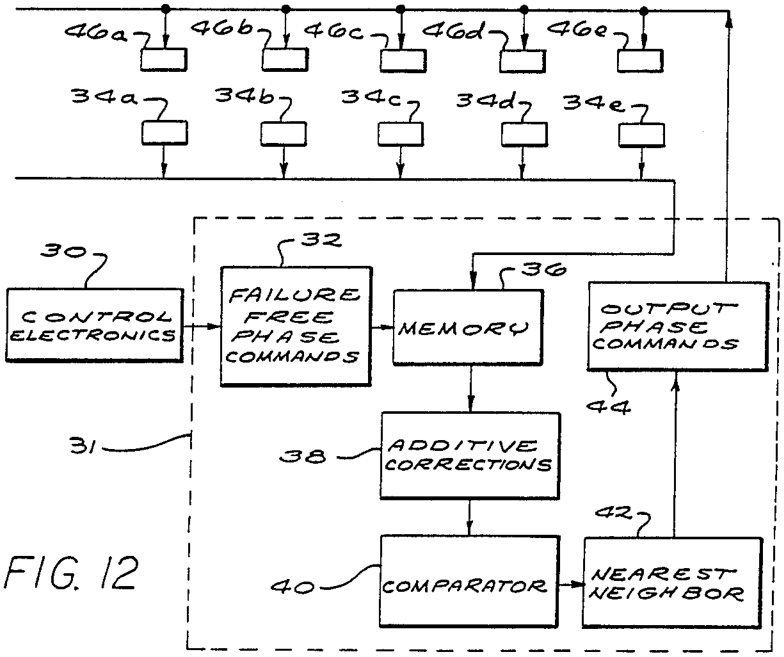
FIG. 12 is a schematic diagram of the system of the invention.

With reference to FIG. 12, the example may be explained in terms of the system components. The control electronics 30 to the radar data processor 31 provide initial impetus to the determination of the failure free phase commands at 32. The failure status determined by detectors 34*a–e* and the failure free commands are stored in memory 36, and the additive correction is determined at 3B. The effectiveness of the additive correction is determined in comparator 40 on the basis of whether the correction is achievable, and if not, the nearest neighbor corrections are determined at 42. The output phase commands are then directed to the individual phase changers 46*a–e*.

From the foregoing it will be appreciated that the method and system of the invention provide for controllability across an entire array of phase shifters in a digitally controlled beam steering controller system for phased array radar, to obtain the best radar coverage by reduction of phase errors which may arise in such a system. It is also significant that the invention provides for these advantages to allow implementation of a digitally controlled beam steering system, to permit improvements in design and manufacturing costs over conventional analog systems.

Although one specific embodiment of the invention has been described and illustrated, it is clear it is susceptible to numerous modifications and embodiments within the ability of those skilled in the art and without the exercise of the inventive facility. Thus, it should be understood that various changes in form, detail and application of the present invention may be made without departing from the spirit and scope of this invention.

I claim:

1. A method of reducing phase error of digitally controlled phase shifters in a beam steering controller system for phased array radar, in which phase commands for achieving a failure free-phase slope are directed to individual phase changer elements in each phase shifter, comprising the steps of:

(a) detecting failure of each of said individual digitally controlled phase changer elements;

(b) determining an additive phase correction which will reduce the number of failed phase changer elements;

(c) determining whether said additive phase correction is achievable by comparing the stuck bit state at each said failed changer element with said additive phase correction; and (d) adjusting said phase commands to the nearest values which can be achieved when said additive phase correction is unachievable.

2. The method of claim 1, wherein said determining whether said additive phase correction is achievable comprises evaluating a discriminant defined as:

$$F(k,i) \cap \overline{(a(k,i) \oplus S(k,i))}$$

where i is the bit level of the phase changer of the kth radiating element phase shifter;

F(k,i) is a failure indicator;

F=0 indicates no failure;

F=1 indicates a failure;

a(k,i) is the commanded value of the bit;

S(k,i) indicates how the phase changer has failed;

S=0 indicates: the phase changer is stuck low

S=1 indicates the phase changer is stuck high where $[F_i \cap \overline{(a_i \oplus S_i)}]_k = 0$ indicates $a_{ik} = S_{ik}$ so that there is no error and the commanded value is achievable; and $[F_i \cap \overline{(a_i \oplus S_i)}]_k = 1$ indicates $a_{ik} \neq S_{ik}$ so that there is an error and the commanded value is unachievable.

3. The method of claim 1 wherein when the nearest value adjustment has been made on one side of the antenna center and the opposite side of the antenna has no error, an equal error is introduced on said opposite side.

4. The method of claim 1, wherein said phase commands are each represented in binary form, with each binary weight class corresponding to a different additive amount of phase shift.

5. The method of claim 1, wherein the average phase slope and the commanded phase slope are equal.

6. The method of claim 1, wherein the mean square deviations about the command phase slope are minimized.

7. The method of claim 1, wherein a uniform weighting is added to said commanded phase slope to minimize the number of erroneously positioned phase changer elements.

8. The method of claim 4, wherein said corrections are applied implementing the most significant bit failure correction last.

9. The method of claim 4, wherein there are five binary weight classes of phase changer elements.

10. A system for reducing phase error of digitally controlled phase shifters having individually digitally controlled phase changer elements, for use in combination with a beam steering controller system for phased array radar, comprising, (a) means for detecting failure of each of said phase changer elements;

(b) means for determining failure free phase shift commands for said phase changers;

(c) means for determining an additive phase correction which will reduce the number of failed phase changer elements;

(d) means for determining whether said additive phase correction is achievable by comparing the stuck bit state at each said failed changer element with said additive phase correction; and (e) means for adjusting said phase commands to the nearest values which can be achieved when said additive phase correction is unachievable.

11. The system of claim 10, wherein said means for determining whether said additive phase correction is achievable comprises means for evaluating a discriminant defined as:

$$F(k,i) \cap (\overline{a(k,i) \oplus S(k,i)})$$

where i is the bit level of the phase changer of the kth radiating element phase shifter;

F(k,i) is a failure indicator;

F=0 indicates no failure;

F=1 indicates a failure;

a(k,i) is the commanded value of the bit;

S(k,i) indicates how the phase changer has failed;

S=0 indicates the phase changer is stuck low

S=1 indicates the phase changer is stuck high where $[F_i \cap (\overline{a_i \oplus S_i})]_k = 0$ indicates $a_{ik} = S_{ik}$ so that there is no error and the commanded value is achievable; and $[F_i \cap (\overline{a_i \oplus S_i})]_k = 1$ indicates $a_{ik} = S_{ik}$ so that there is an error and the commanded value is unachievable.

12. The system of claim 10, wherein there are five binary weight classes of phase changer elements.

* * * * *

UNITED STATES PATENT AND TRADEMARK OFFICE
CERTIFICATE OF CORRECTION

PATENT NO. : 4,924,232

DATED : May 8, 1990

INVENTOR(S) : Ralph E. Hudson et al.

It is certified that error appears in the above-identified patent and that said Letters Patent is hereby corrected as shown below:

Column 1, line 5, before the heading "BACKGROUND OF THE INVENTION," insert the paragraph: --This invention was made with Government support under Contract No. F33657-81-C-0067 awarded by the Air Force. The Government has certain rights in this invention.--

Column 8, line 23, following "$a_0$" in the equation, insert therefor -- : --.

Column 9, line 46, delete "3B" and insert therefor --38--.

Signed and Sealed this

Seventeenth Day of January, 1995

Attest:

BRUCE LEHMAN

*Attesting Officer* *Commissioner of Patents and Trademarks*